United States Patent
Salminen et al.

(10) Patent No.: US 9,426,998 B1
(45) Date of Patent: Aug. 30, 2016

(54) FRUIT AND VEGETABLE PRESERVATIVE

(71) Applicant: ProNatural Brands, LLC, Victor, NY (US)

(72) Inventors: William Salminen, Sarasota, FL (US); Gary M. Russotti, Boca Raton, FL (US); Robert Tuchrelo, Williamson, NY (US); Richard Aab, Fairport, NY (US); Jeffrey Cahoon, Williamson, NY (US)

(73) Assignee: PRONATURAL BRANDS, LLC, Victor, NY (US)

( * ) Notice: Subject to any disclaimer, the term of this patent is extended or adjusted under 35 U.S.C. 154(b) by 0 days.

(21) Appl. No.: 14/621,793

(22) Filed: Feb. 13, 2015

(51) Int. Cl.
*A23L 3/3463* (2006.01)
*A23B 7/154* (2006.01)

(52) U.S. Cl.
CPC ............ *A23B 7/154* (2013.01); *A23V 2002/00* (2013.01)

(58) Field of Classification Search
CPC .................. A23V 2250/708; A23V 2250/20; A23V 2250/214; A23V 2250/2132; A23V 2250/02
USPC ................................ 426/331, 335, 321, 615
See application file for complete search history.

(56) References Cited

U.S. PATENT DOCUMENTS

| | | | | |
|---|---|---|---|---|
| 4,344,971 A | * | 8/1982 | Garbutt | A23B 7/154 426/102 |
| 6,749,875 B2 | * | 6/2004 | Selleck | A01N 3/02 426/270 |

\* cited by examiner

*Primary Examiner* — Helen F Heggestad
(74) *Attorney, Agent, or Firm* — RatnerPrestia

(57) ABSTRACT

Minimally processed fruits and vegetables, such as peeled and cut produce, are preserved by a solution containing a combination of green tea extract catechins and an organic acid or salt thereof selected from any one or any combination of ascorbic acid, erythorbic acid, and salts thereof. The preservative solution prevents residual self-staining properties commonly associated with green tea extract catechins. Processed fruits and vegetables are dipped in, sprayed with, or coated with the preservative solution. The produce preservative solution maintains the color, texture, flavor, appearance, and crispness of the treated produce.

22 Claims, No Drawings

FRUIT AND VEGETABLE PRESERVATIVE

FIELD OF THE INVENTION

This invention relates to the preservation of fruits and vegetables, including minimally processed produce, using a preservative solution containing green tea extract catechins and an organic acid. The preservative solution prevents residual self-staining commonly associated with green tea extract catechins.

BACKGROUND OF THE INVENTION

After processing, such as peeling or cutting, most fruits and vegetables discolor. The discoloration is typically due to enzymes within the fruits or vegetables that metabolize colorless endogenous chemical compounds into colored chemical compounds that lead to the discoloration, often a browning. A major enzyme responsible for browning in many fruits and vegetables is polyphenoloxidase.

Various methods have been used to prevent the browning of processed produce. A very effective means of preserving produce is through the use of sulfites (e.g., U.S. Pat. No. 2,894,843 discloses the treatment of fruits and vegetables with various sulfites). Sulfites were widely used for preserving minimally processed fresh fruits and vegetables; however, due to health concerns, the US Food and Drug Administration no longer allows the use of sulfites for the preservation of fresh, including minimally processed, produce.

Since sulfites are no longer allowed for preserving fresh produce, alternative methods have been developed. A commonly used approach is treating the processed produce with ascorbic acid or an ascorbate salt (e.g., see U.S. Pat. Nos. 3,754,938 and 4,011,348). Ascorbic acid is an antioxidant and prevents the enzymatic oxidation, and coloration, of endogenous chemical compounds in the fruit or vegetable; however, the effect is short lived or requires very high concentrations of antioxidant (Gil et al., "Response of Fuji Apple Slices to Ascorbic Acid Treatments and Low-Oxygen Atmospheres," HortScience, volume 33, number 2, 1998, pp. 305-309).

U.S. Pat. Nos. 5,925,395 and 5,939,117 disclose treating fresh cut fruit and vegetables with a combination of ascorbate (or erythorbate) ions and calcium ions. Preservation lasts several weeks; however, an excessive amount of ascorbate ion in some embodiments (up to 22.5% in the preservation solution) is needed for preservation.

U.S. Pat. Nos. 7,851,002, 8,101,221, and 8,609,169 take a similar approach of combining ascorbic acid/ascorbate (or erythorbic acid/erythorbate) with various metal ions such as magnesium, zinc, strontium, lithium, barium, aluminum, copper, iron, ammonium, manganese, and potassium. Many of these metal ions are not preferred for a food preservation product and a large concentration of preservative is required.

U.S. Pat. No. 5,922,382 discloses a method for preserving fresh cut fruit using ascorbic acid. However, the method is labor intensive and involves the use of sanitizing and flavoring agents. In addition, the concentration of ascorbic or erythorbic acid in the preservation solution is high (up to 15% weight/volume).

U.S. Pat. No. 6,749,875 (and patent application US 2002/0054950) and international patent WO 01/64041 use a combination of flavonoid and food grade antioxidant in a ratio by weight of 1:50 to 1:150. The flavonoids listed in the patent claims include acerola, quercitin, hesperidin, rutin, and flavonoid rich extracts from pine bark, grape seeds, citrus seeds, cranberries, Juniper berries and rosehips. Furthermore, the patent defines flavonoids, which is technically a very broad and general classification for a wide array of plant-derived polyphenolic compounds, as flavone, flavonols, flavanones, chalcones, anthocyanidins, proanthocyanidins, and isoflavonoids. The US patent states that the flavonoid and antioxidant can be diluted in water, tea infusion, or fruit juice for preparation of the fruit or vegetable preservation solution. The US patent discloses two formulations that include a flavonoid source, an antioxidant, and a water+tea dilution solution. For example, one formulation for treating chestnuts included 90 mg enzogenol (flavonoid), 5 g calcium ascorbate (antioxidant), and 200 ml water+5 mg green tea (dilution solution). Although green tea was included, it was at a very low concentration (0.0025 wt %) and was not taught for the purposes of supplying flavonoids since the flavonoids in green tea are primarily catechins, which are not listed as applicable flavonoids in the patent. The patent instead states that tea is used as a dilution solution. Furthermore, the patent examples required modified atmosphere packaging for packed fruit, whereas, it is desirable to develop an antibrowning preservative that does not have special atmosphere handling or packaging requirements.

It is not surprising that catechins (also known as flavanols), particularly green tea extract catechins, were not included at significant levels in the preservative formulations of U.S. Pat. No. 6,749,875 and international patent WO 01/64041, since catechins have a strong brown color and can result in significant discoloration of produce, particularly light colored flesh, such as apples, pears, and potatoes, when used as a treatment (e.g., dipping) solution. Despite the residual self-staining caused by the green tea extract catechins, there are several desirable properties of green tea extract catechins that make them particularly suited for preventing the enzymatic discoloration of produce. First, green tea extract catechins are antioxidants and can reduce the enzymatic oxidation of colorless endogenous chemical compounds within the fruit or vegetable into colored, typically brown, chemical compounds (Kim et al., "New Insights Into the Mechanisms of Polyphenols Beyond Antioxidant Properties; Lessons from the Green Tea Polyphenol, Epigallocatechin 3-Gallate," Redox Biology, volume 2, 2014, pp. 187-195). Second, green tea extract catechins have been shown to inhibit polyphenoloxidase, which is a key enzyme involved in the production of colored chemical compounds within the fruit or vegetable (Soysal, "Effects of Green Tea Extract on Golden Delicious Apple Polyphenoloxidase and its Browning," J. Food Biochemistry, volume 33, issue 1, 2009, pp. 134-148). The major problem though is the residual self-staining caused by the normal dark color of the green tea extract catechins and this is particularly problematic as the catechins themselves become oxidized over time since oxidation results in an even darker coloration (Wang et al., "Various Antibrowning Agents and Green Tea Extract During Processing and Storage," J. Food Processing and Preservation, volume 27, issue 3, 2003, pp. 213-225).

Martin-Diana et al. ("Green Tea Extract as a Natural Antioxidant to Extend the Shelf-Life of Fresh-Cut Lettuce," Innovative Food Science and Emerging Technologies, volume 9, 2008, pp. 593-603) demonstrated that green tea extract treatment of fresh-cut lettuce helped to prevent the loss of the antioxidants ascorbic acid and carotenoids. However, green tea extract increased the browning of the lettuce in a concentration-dependent manner. Wessels et al. ("Effect of Selected Plant Extracts on the Inhibition of Enzymatic Browning in Fresh-Cut Apple," Journal of Applied Botany and Food Quality, volume 87, 2014, pp. 16-23) demonstrated that green tea extract could partially retard the browning of apple slices; however, the green tea extract demonstrated significant passive staining (i.e., residual self-staining) In line with many published reports, Wessels et al. (2014) also demonstrated that green extract had a high level of antioxidant activity. Lavelli et al ("Stability and Anti-Glycation Properties of Intermediate Moisture Apple Products Fortified with Green Tea," Food Chemistry, volume 127, 2011, pp. 589-595) added green tea extract to intermediate moisture apple products and noted that the green tea extract darkened the apple color. Soysal (2009), cited above, demonstrated that green extract inhibited polyphenol oxidase and retarded browning; however, apple browning was only investigated over a 145 minute period and the apples had significant residual self-staining as indicated by a higher browning index immediately after treatment with the green tea extract when compared to the untreated control.

The stability of green tea extract catechins is affected by various factors, with pH being a critical component (Chen et al. "Stabilizing Effect of Ascorbic Acid on Green Tea Catechins," J. Agri. Food Chem., volume 46, number 7, 1998, pp. 2512-2516; Zhu et al. "Stability of Green Tea Catechins," J. of Agricultural and Food Chemistry, volume 45, issue 12, 1997, pp. 4624-4628; Li et al. "Kinetic Study of Catechin Stability: Effects of pH, Concentration, and Temperature," J. of Agricultural and Food Chemistry, volume 60, issue 51, 2012, pp. 12531-12539). Conflicting reports have demonstrated the role of other additives on the stability of green tea extract catechins themselves. For example, Ortiz et al. ("Interaction of Environmental Moisture with Powdered Green Tea Formulations: Effect on Catechin Chemical Stability," J. of Agricultural and Food Chemistry, volume 56, issue 11, 2008, pp. 4068-4077) demonstrated that ascorbic acid increased green tea extract catechin degradation; whereas, Chen et al. (1998) demonstrated that ascorbic acid decreased green tea extract catechin degradation. Wang et al. (2003) demonstrated that citric acid decreased the degradation of green tea extract catechins and helped to retard the additional browning of the green tea extract due to the degraded catechins.

It is an object of this invention to provide an improvement in preserving minimally processed produce using a naturally-derived preservative solution, particularly for preserving light or white colored produce flesh. Furthermore, special handling or packaging should not be required for the preserved produce.

SUMMARY OF THE INVENTION

In accordance with one embodiment, the invention is directed towards a method of preserving minimally processed fruits and vegetables and extending their useful shelf-life comprising: (a) providing an aqueous preservative solution comprising (i) at least 0.008 wt percent catechins and (ii) an organic acid or salt thereof selected from any one or any combination of ascorbic acid, erythorbic acid, and salts thereof; wherein the weight ratio of catechins to organic acid or salt thereof is from 1:10 to 1:300; and (b) applying the preservative solution to a minimally processed fruit or vegetable. In a further embodiment, the invention is directed towards an aqueous solution for preserving minimally processed fruits and vegetables and extending their useful shelf-life consisting essentially of (i) water; (ii) green tea extract; (iii) an organic acid or salt thereof selected from any one or any combination of ascorbic acid, erythorbic acid, and salts thereof; optionally (iv) a basic neutralizer approved for food use selected from the group consisting of: sodium hydroxide, potassium hydroxide, sodium carbonate, sodium bicarbonate, potassium carbonate, potassium bicarbonate, and calcium carbonate; and, optionally (v) a food-safe anionic surfactant; wherein the green tea extract comprises catechins, the catechins are present at a concentration of at least 0.008 wt % of the solution, and the weight ratio of catechins to organic acid or salt thereof in the solution is from 1:10 to 1:300.

The present invention enables extending the shelf life and appearance of minimally processed fruits and vegetables, as well as normal handling, packaging, and storage of the preserved fruits and vegetables under normal atmosphere and pressure conditions.

As described in the background information, this invention is partly predicated by the ability of catechins, and in particular green tea extract catechins, to act as antioxidants and inhibit polyphenoloxidase. In accordance with the invention, it has been discovered that organic acids, particularly acids with antioxidant properties such as ascorbic acid and its isomer erythorbic acid, interact with the catechins in green tea extract in a synergistic manner to prevent the browning of processed produce, including minimally processed produce, such as apple or potato slices. Application of either the organic acid or green tea extract catechins alone results in less than satisfactory antibrowning properties and in the case of green tea extract catechins, results in significant self-staining. It has been further discovered, however, that the organic acid surprisingly prevents the self-staining discoloration normally associated with produce treated with green tea extract catechins when used in amounts effective to provide antibrowning of the treated produce. This latter finding is critical for acceptance of a green tea extract catechin produce preservative solution, particularly for use on fruits and vegetables with light colored or white flesh, such as apple, pear, or potato slices. Further, due to the synergistic interaction of the ascorbic acid and green tea extract, it has been demonstrated that the present invention advantageously enables use of a relatively much lower concentration of preservative to be employed in order to provide the desired antibrowning effect over extended time periods.

In various embodiments, minimally processed fruits and vegetables (e.g., peeled, cored, or sliced) may be treated with a preservative solution containing green tea extract catechins and an organic acid or salt thereof with antioxidant properties selected from any one or any combination of ascorbic acid, erythorbic acid, and salts thereof. The fruits or vegetables can be treated with a variety of methods such as dipping, spraying, or coating with the preservative solution. After treatment, the fruits and vegetables can then be packed and stored using conventional procedures under normal atmosphere and pressure conditions. Treatment with the preservative solution thus advantageously extends the shelf-life of the produce without the use of special handling or packaging requirements.

DETAILED DESCRIPTION OF THE INVENTION

The present invention pertains to the use of a preservative solution that retains the natural color, texture, and flavor of minimally processed produce such as peeled and/or cut fruits and vegetables. The invention applies to all types of minimally processed fruits and vegetables and is particularly useful for processed produce that degrades rapidly shortly after processing such as apples, pears, avocados, potatoes, and mushrooms. Preserved fruits and vegetables are prevented from browning and retain their natural color, texture, and flavor under normal storage conditions, such as refrigeration under normal atmosphere and pressure.

The preservative solution is comprised of catechins and an organic acid. The catechins preferably comprise at least 25 wt % epigallocatechin-3-gallate (EGCG), and are preferably provided by green tea extract having a catechin content of at least 50 wt %, more preferably at least 75 wt %, and more particularly an epigallocatechin-3-gallate (EGCG) content of at least 20 wt %, more preferably at least 40 wt %. The green tea extract also preferably contains less than 25 wt % caffeine, more preferably less than 10 wt % caffeine. The organic acid content can be provided by one or more of ascorbic acid, erythorbic acid, or a salt thereof. Ascorbic acid and erythorbic acid have natural antioxidant properties, adding to the overall antioxidant potential of the preservative solution. The final, diluted preservative solution applied to produce in accordance with the invention contains at least 0.008 wt % catechins, and preferably contains 0.008% to 10% green tea extract catechins, more preferably at least 0.02%, at least 0.05%, or at least 0.08%, and more preferably at most 2%, at most 1%, or at most 0.5% green tea extract catechins. The final, diluted preservative solution preferably contains 0.2% to 20% organic acid or salt thereof, more preferably at least 0.5%, at least 1%, or at least 2%, and more preferably at most 10%, at most 7% or at most 5% organic acid or salt thereof. The weight ratio of catechins to organic acid or salt thereof is from 1:10 to 1:300, more preferably from about 1:100 to 1:300, as use of more than 300 parts organic acid to 1 part catechin is not needed to provide the observed preservative effect, and as use of less than 10 parts organic acid to 1 part catechin may not provide as great as desired effect. Unless otherwise stated, all percentages and component ratios further indicated herein are also weight (wt) percentages and weight (wt) ratios.

If desired, the pH of the preservative solution can be increased with a buffering agent such that the pH of the final, diluted preservative solution is still acidic (i.e., <7.0). Adjusting the pH decreases the acidic taste of the preservative solution. This is important for preservative solutions with very high ascorbic acid concentrations; however, since the preservative solutions described in accordance with the invention enable relatively low ascorbic acid concentrations due to the synergistic interaction with the green tea extract catechins, neutralization may not be required. If raising the pH is desired, the buffering agent can be any basic neutralizing agent acceptable for use on food such as sodium hydroxide, potassium hydroxide, calcium carbonate, sodium carbonate, sodium bicarbonate, potassium carbonate, or potassium bicarbonate. Alternatively, a combination of the organic acid and any salt form of the organic acid can be combined in a ratio that results in the target pH.

If antimicrobial properties are desired to further help extend the shelf-life of the treated produce, a food-safe anionic surfactant can be added to the formulation preferably at 0.001% to 0.5%, more preferably at least 0.02%, at least 0.04%, or at least 0.08%, and more preferably at most 0.2%, at most 0.15%, or at most 0.1%. Useful anionic surfactants include, e.g., sulfated fatty acids such as C6-C18 alkyl sulfates, more particularly C8-C14 alkyl sulfates, and in particular sodium lauryl sulfate.

The preservative solution can be prepared by combining ingredients at final ready-to-use concentrations, or by diluting previously made concentrated solutions or powder mixtures with added water. For powder and concentrated solutions, the amount of green tea extract catechins, organic acid, and buffering agent in the powder or concentrated solution are increased in proportion to the final use concentrations. The use of concentrated solutions allow end users to prepare larger quantities of end-use solutions from small amounts of concentrated solution, which facilitates shipping and handling by minimizing product volume. In a particular embodiment, e.g., the concentrated solution compositions may be designed to be diluting with at least one, and more preferably at least 9 additional parts of water to one part of the concentrate composition to form a diluted end use solution. For example, if a 10× concentrated solution is prepared and the final, diluted solution is desired to provide 0.1% of green tea extract catechins and 3% of ascorbic acid, the concentration of green tea extract catechins in the 10× concentrated solution would be 1% and the concentration of ascorbic acid would be 30%. In the case of the powder or concentrated solution, the preservative powder or concentrate is diluted in normal processing water to the desired use concentration. The processed produce is then treated with the preservative solution by dipping, spraying, coating, or any other means that results in adequate exposure of the cut or peeled surface of the produce to the preservative solution. After treatment, the preserved produce may then be packaged and stored using conventional procedures and temperatures. In order to maximize the duration of preservation, it is preferred that the preserved produce is stored between −6° C. to 20° C., preferably, −3 to 10° C., and most preferably 0 to 6° C., under normal atmosphere content and pressure. When preserved and stored in this manner, even more perishable processed produce, such as apples and potatoes, are preserved in a natural state that retains color, texture, and flavor under normal refrigerated storage conditions.

EXAMPLES OF PRESERVATIVE SOLUTIONS

The following are examples, not meant to be all inclusive, of different preservative solutions. All components of the preservatives are food grade and allowed for use on food in the United States by the US Food and Drug Administration. The green tea extract (GTE) employed in all examples comprised 83.2% total catechins, and more particularly 50.1% EGCG, and 1.8% caffeine. In the examples, water can be eliminated from each example to provide a concentrated powder. For concentrated powders, the ready-to-use liquid antibrowning solution is prepared by adding the indicated amount of water to the indicated total weight of powder.

Example 1

A ready-to-use solution is prepared by combining the following in water:
1. 10 g of ascorbic acid
2. 1 g of green tea extract (83% catechins)
3. Water to 1 L Example 2

A ready-to-use solution is prepared by combining the following in water:
1. 30 g of ascorbic acid
2. 1 g of green tea extract (83% catechins)
3. Water to 1 L Example 3

A ready-to-use solution is prepared by combining the following in water:
1. 30 g of ascorbic acid
2. 15 g of sodium bicarbonate 3. 1 g of green tea extract (83% catechins)
4. Water to 1 L Example 4

A 5-fold concentrated solution is prepared by combining the following in water:
1. 200 g of ascorbic acid
2. 25 g of calcium carbonate
3. 15 g of green tea extract (83% catechins)
4. Water to 1 L Example 5

A ready-to-use solution is prepared by combining the following in water:
1. 40 g of erythorbic acid
2. 2 g of calcium carbonate
3. 10 g of sodium bicarbonate
4. 3 g of green tea extract (83% catechins)
5. Water to 1 L Example 6

A 10-fold concentrated solution is prepared by combining the following in water:
1. 300 g of ascorbic acid
2. 30 g of calcium carbonate
3. 100 g of sodium bicarbonate
4. 10 g of green tea extract (83% catechins)
5. Water to 1 L Example 7

A ready-to-use solution is prepared by combining the following in water:
1. 40 g of calcium ascorbate
2. 1 g of green tea extract (83% catechins)
3. Water to 1 L Example 8

A ready-to-use solution is prepared by combining the following in water:
1. 30 g of ascorbic acid
2. 1 g of green tea extract (83% catechins)
3. 0.8 g of sodium lauryl sulfate
4. Water to 1 L Example 9

A concentrated powder is prepared by combining the following ingredients. When used to prepare the final anti-browning solution, 31.4 g of powder is added to 1 liter of water:
1. 30 g of ascorbic acid
2. 1 g of green tea extract (83% catechins)
3. 0.4 g of sodium lauryl sulfate Example 10

A ready-to-use solution is prepared by combining the following in water:
1. 30 g of ascorbic acid
2. 1 g of green tea extract (83% catechins)
3. 0.2 g of sodium lauryl sulfate
4. Water to 1 L Assessment of the Performance of the Preservative Solutions The effectiveness of the preservation solution on one highly perishable fruit, apple slices, and one highly perishable vegetable, potato slices, was evaluated by a battery of tests.

Preliminary testing was conducted with aqueous solutions of various concentrations of ascorbic acid, green tea extract, and combinations of ascorbic acid and green tea extract as noted in Table 1 below to determine the ability of ascorbic acid to prevent the brown discoloration associated with green tea extract catechins, and determine the optimal concentrations of combinations of ascorbic acid and green tea extract catechins for preventing the browning of red delicious apple slices. A description of the qualitative and quantitative color assessment procedures is provided below.

TABLE 1

Qualitative and quantitative assessments of color of red delicious apple slices during storage at 4° C.

| Treatment | Time of Qualitative Assessment | | | Time of Quantitative Assessment | |
|---|---|---|---|---|---|
| | Color | | | Blue Value (% of Fresh Cut) | White Value (% of Fresh Cut) |
| | 5 minutes | 1 day | 2 days | 2 days | 2 days |
| Untreated | W | +++ B | +++ B | 64.0 | 79.4 |
| 0.003% GTE | W | +++ B | +++ B | NC | NC |
| 0.01% GTE | +/− B | + B | + B | NC | NC |
| 0.03% GTE | +/− B | + B | + B | NC | NC |
| 0.1% GTE | + B | + B | + B | NC | NC |
| 3% AA | W | +/− B | + B | 72.6 | 83.1 |
| 3% AA + 0.003% GTE | W | +/− B | + B | 79.0 | 85.7 |
| 3% AA + 0.01% GTE | W | W | W | 96.7 | 95.0 |
| 3% AA + 0.03% GTE | W | W | W | 98.0 | 98.1 |
| 3% AA + 0.1% GTE | W | W | W | 97.2 | 97.5 |

NOTES:
GTE = green tea extract (83% catechins), AA = ascorbic acid, B = brown color, W = white color (same as fresh cut slices), NC = not conducted. Brown discoloration scored on the following scale: W = no browning, +/− = very slight, + = slight, ++ = minimal, +++ = moderate, ++++ = marked. n = 4 slices per treatment.

Green tea extract at 0.003% (i.e., approximately 0.0025% catechins) did not discolor the flesh of the apple slices; however, it also did not provide a synergistic interaction with ascorbic acid in enhancing the anti-browning effect (Table 1). In contrast, green tea extract at 0.01% (i.e., approximately 0.008% catechins) stained the flesh of apple slices brown; however, the addition of 3% ascorbic acid prevented this brown staining (Table 1). In addition, green tea extract at 0.01% had a strong synergistic interaction with 3% ascorbic acid and maintained the appearance of the apple slices similar to the white flesh of fresh cut apple slices over 2 days storage at 4° C. (Table 1). In subsequent experiments, the preservation effect was tested for longer durations as outlined below.

Color was assessed either by a qualitative rating by eye or quantitatively using a digital color scanner after the specified period of storage. For quantitative assessment, the cut surface of each apple or potato slice was digitized as a color bitmap image at a resolution of 200 dots per inch using 16-bit red, green, blue (RGB) color. In order to ensure the images were standardized, a series of white, several gradations of grey, and black color swatches were scanned with each scan. The average individual RGB signals were measured for each apple or potato slice using the publicly available program NIH Image J 1.47v (available at imagej.nih.gov/ij). Whiteness was assessed as the average of the red+green+blue values. In addition, since decreases in the blue signal are highly associated with the color of browning observed in processed apples and potatoes, the changes in the blue signal were assessed individually. Decreases in the red and green signals are also associated with browning; however, they are typically less affected than the blue signal, making changes in the blue signal a good surrogate for browning of produce. For each time point and treatment, at least four apple or potato slices were measured and the values averaged.

For the apples slices, the flavor, texture, and moistness of the preserved apple slices were qualitatively assessed by tasting the slices after 14 days of storage and comparing them to fresh cut apple slices. For the apple and potato slices, color and appearance were also rated qualitatively and compared to fresh cut apples or potatoes on each assessment day. Firmness of the apple slices was assessed after 14 days of storage using a manual penetrometer and compared to fresh cut apple slices.

A series of tests were conducted to determine the efficacy of the preservative solutions on apple and potato slices.

In the first test, the following ready-to-use preservative solutions were prepared in water:

1) 3% ascorbic acid+0.1% green tea extract (83% catechins)
2) 1% ascorbic acid+0.1% green tea extract (83% catechins)

Red delicious apples were washed thoroughly with soap and water and rinsed thoroughly with water after washing. Red delicious apples were selected since they are one of the most difficult apple varieties to prevent from browning. Apples slices were prepared by using a manual apple corer/slicer that prepared 10 slices per apple. Apple slices were randomly mixed from multiple apples and then placed in each preservative solution, 1 or 3% ascorbic acid, 0.1% green tea extract (83% catechins), or left untreated for approximately 5 minutes. The slices were then placed in plastic containers and stored at approximately 4° C. After the indicated time, one cut surface of each slice was digitized. In addition, the color, general appearance, and smell were assessed qualitatively at the indicated times and compared to fresh cut apple slices. After 14 days of storage, apple slices were assessed for firmness quantitatively using a manual penetrometer. After 14 days of storage, flavor, moisture, and texture were qualitatively assessed only for slices that had normal appearance by tasting each slice.

TABLE 2

Quantitative measurement of blue and white values of cut surface of red delicious apple slices during storage at 4° C.

| | Day of Assessment | | | | | |
|---|---|---|---|---|---|---|
| | Blue Value (% of Fresh Cut) | | | White Value (% of Fresh Cut) | | |
| Treatment | 1 | 7 | 14 | 1 | 7 | 14 |
| Untreated | 82.6 | 69.1 | 67.3 | 90.1 | 81.6 | 80.6 |
| 0.1% GTE | 81.8 | 68.0 | 65.7 | 87.8 | 77.6 | 76.3 |
| 1% AA | 82.9 | 74.5 | 64.7 | 87.2 | 82.9 | 77.1 |
| 3% AA | 97.3 | 84.1 | 79.2 | 94.9 | 88.1 | 86.7 |
| 1% AA + 0.1% GTE | 97.6 | 84.5 | 73.4 | 95.3 | 87.9 | 80.8 |
| 3% AA + 0.1% GTE | 100.6 | 101.3 | 100.4 | 96.2 | 97.0 | 96.5 |

NOTES:
GTE = green tea extract (83% catechins), AA = ascorbic acid, blue value = blue channel value from digitized image of cut surface of apple slice, white value = average of red + green + blue (RGB) values from digitized image of cut surface of apple slice. n = 4 slices per treatment.

The data in Table 2 demonstrate that the combination of 3% ascorbic acid and 0.1% green tea extract (i.e., approximately 0.08% catechins) prevented the residual self-staining inherent with green tea extract catechins and potentiated the antibrowning properties of either component by itself.

TABLE 3

Firmness measurement of red delicious apple slices after 14 days of storage at 4° C.

| Treatment | Firmness (% of Fresh Cut) |
|---|---|
| Untreated | 76.5 |
| 0.1% GTE | 86.0 |
| 1% AA | 86.5 |
| 3% AA | 85.5 |
| 1% AA + 0.1% GTE | 95.0 |
| 3% AA + 0.1% GTE | 102.5 |

NOTES:
GTE = green tea extract (83% catechins),
AA = ascorbic acid.
n = 5 slices per treatment.

The data in Table 3 demonstrate that the combination of 3% ascorbic acid and 0.1% green tea extract (i.e., approximately 0.08% catechins) maintained the firmness of the apple slices during storage.

TABLE 4

Qualitative assessments of color and smell of red delicious apples slices during storage at 4° C.

| | Time of Assessment | | | | | | | | | |
|---|---|---|---|---|---|---|---|---|---|---|
| | 4 hours | | 1 day | | 3 days | | 7 days | | 14 days | |
| Treatment | Color | Smell | Color | Smell | Color | Smell | Color | Smell | Color | Smell |
| Untreated | +++ B | Fresh | +++ B | None | +++ B | None | +++ B | None | ++++ B | Fermented |
| 0.1% GTE | + B | Fresh | + B | Fresh | + B | Minimal | ++ B | Minimal | ++++ B | Minimal |
| 1% AA | ++ B | Fresh | ++ B | Fresh | ++ B | Minimal | ++ B | Minimal | +++ B | Minimal |
| 3% AA | W | Fresh | W | Fresh | +/− B | Fresh | + B | Minimal | ++ B | Minimal |

TABLE 4-continued

Qualitative assessments of color and smell of red delicious apples slices during storage at 4° C.

| Treatment | Time of Assessment | | | | | | | | |
|---|---|---|---|---|---|---|---|---|---|
| | 4 hours | | 1 day | | 3 days | | 7 days | | 14 days | |
| | Color | Smell | Color | Smell | Color | Smell | Color | Smell | Color | Smell |
| 1% AA + 0.1% GTE | W | Fresh | W | Fresh | +/− B | Fresh | + B | Minimal | ++ B | Weak |
| 3% AA + 0.1% GTE | W | Fresh | W | Fresh | W | Fresh | W | Fresh | W | Fresh |

NOTES:
GTE = green tea extract (83% catechins), AA = ascorbic acid, B = brown color, W = white color. Brown discoloration scored on the following scale: W = no browning, +/− = very slight, + = slight, ++ = minimal, +++ = moderate, ++++ = marked. n = 4 slices per treatment. Smell assessed as follows: fresh = smell of fresh cut apple slices, minimal = no significant smell, weak = slight fresh cut apple slice smell, fermented = noticeable fermented smell.

TABLE 5

Qualitative assessments of flavor, moistness, and texture of red delicious apple slices after 14 days of storage at 4° C.

| Treatment | Flavor | Moistness | Texture |
|---|---|---|---|
| Untreated | Not tested | Not tested | Not tested |
| 0.1% GTE | Not tested | Not tested | Not tested |
| 1% AA | Not tested | Not tested | Not tested |
| 3% AA | Not tested | Not tested | Not tested |
| 1% AA + 0.1% GTE | Not tested | Not tested | Not tested |
| 3% AA + 0.1% GTE | Same as fresh cut slices | Same as fresh cut slices | Same as fresh cut slices |

NOTES:
GTE = green tea extract (83% catechins), AA = ascorbic acid. Samples labeled as "not tested" were not assessed since they exhibited significant browning and were not considered palatable at the assessment time point.

The data in Tables 4 and 5 demonstrate that the combination of 3% ascorbic acid and 0.1% green tea extract (i.e., approximately 0.08% catechins) maintained the color, smell, flavor, moistness, and texture of apple slices.

In order to test the effect of a pH modifier on the efficacy of the preservative solution, the following Ready-to-use preservative solutions were prepared in water:

1) 3% ascorbic acid+0.1% green tea extract (83% catechins)
2) 3% ascorbic acid+1.33% sodium bicarbonate+0.1% green tea extract (83% catechins)
3) 3% ascorbic acid+1.5% sodium bicarbonate+0.1% green tea extract (83% catechins)

Red delicious apples were washed thoroughly with soap and water and rinsed thoroughly with water after washing. Apples slices were prepared by using a manual apple corer/slicer that prepared 10 slices per apple. Apple slices were randomly mixed from multiple apples and then placed in each preservative solution or 3% ascorbic acid for approximately 5 minutes. The slices were then placed in plastic containers and stored at approximately 4° C. After the indicated time, the slices were qualitatively assessed for appearance.

TABLE 6

Qualitative assessment of appearance of red delicious apple slices in various preservative solutions after storage at 4° C.

| Treatment | pH of Solution | Appearance | | |
|---|---|---|---|---|
| | | Day 2 | Day 7 | Day 14 |
| 3% AA | 2.25 | W | +B | ++B |
| 3% AA + 0.1% GTE | 2.31 | W | W | W |
| 3% AA + 1.33% SB + 0.1% GTE | 5.42 | W | W | W |
| 3% AA + 1.5% SB + 0.1% GTE | 6.27 | W | W | W |

NOTES:
GTE = green tea extract (83% catechins),
AA = ascorbic acid,
SB = sodium bicarbonate,
B = brown color,
W = white color.
Brown discoloration scored on the following scale:
W = no browning,
+/− = very slight,
+ = slight,
++ = minimal,
+++ = moderate,
++++ = marked.
n = 4 slices per treatment.

The data in Table 6 demonstrate that the efficacy of the ascorbic acid and green tea extract catechins preservative solutions was the same whether or not sodium bicarbonate was added to increase the pH of the final preservative solution.

In order to determine if the preservative solution would work equally as well on completely peeled, cored, and sliced apples, the following ready-to-use preservative solution was prepared in water:

3% ascorbic acid+0.1% green tea extract (83% catechins)

Red delicious apples were washed thoroughly with soap and water and rinsed thoroughly with water after washing. The apples were manually peeled and then slices prepared using a manual apple corer/slicer that prepared 10 slices per apple. Apple slices were randomly mixed from multiple apples and then placed in the preservative solution or 3% ascorbic acid for approximately 5 minutes. The slices were then placed in a plastic container and stored at approximately 4° C. After the indicated time, the entire slice (peeled and cut surfaces) was qualitatively assessed for appearance.

TABLE 7

Qualitative assessment of appearance of peeled red delicious apple slices after storage at 4° C.

| | Appearance | | | | |
|---|---|---|---|---|---|
| Treatment | 6 Hours | 1 Day | 2 Days | 7 Days | 14 Days |
| Untreated | ++ B | +++ B | +++ B | Not assessed | Not assessed |
| 3% AA | W | + B | + B | ++ B | ++ B |
| 3% AA + 0.1% GTE | W | W | W | W | W |

NOTES:
GTE = green tea extract (83% catechins), AA = ascorbic acid, B = brown color, W = white color. Brown discoloration scored on the following scale: W = no browning, +/− = very slight, + = slight, ++ = minimal, +++ = moderate, ++++ = marked. n = 4 slices per treatment.

The data in Table 7 demonstrate that the 3% ascorbic acid and 0.1% green tea extract (i.e., approximately 0.08% catechins) preservative solution maintained the whiteness of the peeled and cut surfaces of the peeled apple slices.

The efficacy of the preservative solution was tested on baking potatoes, which are a difficult vegetable to prevent from browning. The following ready-to-use preservative solutions were prepared in water:

4% ascorbic acid+0.1% green tea extract (83% catechins)

Baking potatoes were washed thoroughly with soap and water and rinsed thoroughly with water after washing. The potatoes were peeled and then rinsed with water. The potato slices were prepared by manual slicing with a knife. Slices were randomly mixed from multiple potatoes and then placed in preservative solution, 4% ascorbic acid, or 0.1% green tea extract (83% catechins) for approximately 5 minutes. The slices were then placed in plastic containers and stored at approximately 4° C. After the indicated time, one cut surface of each slice was digitized. In addition, the color and general appearance were assessed qualitatively at the indicated times and compared to fresh cut potato slices.

TABLE 8

Quantitative measurement of blue and white values of cut surface of potato slices during storage at 4° C.

| | Day of Assessment | | | | | |
|---|---|---|---|---|---|---|
| | Blue Value (% of Fresh Cut) | | | White Value (% of Fresh Cut) | | |
| Treatment | 4 | 6 | 7 | 4 | 6 | 7 |
| Untreated | 44.3 | 53.4 | 56.2 | 51.3 | 59.6 | 61.0 |
| 0.1% GTE | 83.6 | 80.2 | 78.2 | 87.3 | 84.4 | 82.3 |
| 4% AA | 92.0 | 88.5 | 87.2 | 93.7 | 93.0 | 92.1 |
| 4% AA + 0.1% GTE | 97.4 | 97.2 | 96.6 | 96.5 | 96.2 | 96.6 |

NOTES:
GTE = green tea extract (83% catechins), AA = ascorbic acid, blue value = blue channel value from digitized image of cut surface of apple slice, white value = average of red + green + blue (RGB) values from digitized image of cut surface of apple slice. n = 4 slices per treatment.

The data in Table 8 demonstrate that the combination of 4% ascorbic acid and 0.1% green tea extract (i.e., approximately 0.08% catechins) potentiated the antibrowning properties of either component by itself

TABLE 9

Qualitative assessment of color and appearance of peeled baking potato slices after storage at 4° C.

| | Color and Appearance | | | | | |
|---|---|---|---|---|---|---|
| Treatment | 1 Day | 3 Days | 4 Days | 5 Days | 6 Days | 7 Days |
| Untreated | +++ B & G | ++++ B & G Dry appearance | ++++ B & G Dry appearance | ++++ B & G Dry appearance | ++++ B & G Dry appearance | ++++ B & G Dry appearance |
| 0.1% GTE | +/− B | + B | + B | ++ B | ++ B Dry appearance | ++ B Dry appearance |
| 4% AA | W | +/− B | + B Dry appearance | + B Dry appearance | ++ B Dry appearance | ++ B Dry appearance |
| 4% AA + 0.1% GTE | W | W | W | W | +/− B | +/− B |

NOTES:
GTE = green tea extract (83% catechins), AA = ascorbic acid, B = brown color, G = grey color, W = white color. Dry appearance = no moistness on assessed surface and dried and cracking lines/areas on surface. Discoloration scored on the following scale: W = no discoloration, +/− = very slight, + = slight, ++ = minimal, +++ = moderate, ++++ = marked. n = 4 slices per treatment. Color and appearance labeled as just "W" exhibited a color and appearance the same as fresh cut potato slices.

The data in Table 9 demonstrate that the 4% ascorbic acid and 0.1% green tea extract (i.e., approximately 0.08% catechins) preservative solution maintained the whiteness of the peeled and cut surfaces of the potato slices better than ascorbic acid or green tea extract alone.

An antibrowning solution with improved antimicrobial properties can be prepared by adding a food-safe anionic surfactant such as sodium lauryl sulfate. The antimicrobial properties of the three solutions from Examples 8, 9, and 10 was assessed against a yeast that is problematic in food processing operations, *Candida albicans*. The effectiveness was assessed in a suspension time kill assay. In brief, the microbial suspension (~1×10$^7$ CFU/ml) was added to 9.9 times the volume of 1× end-use antibrowning/antimicrobial solution. After 15 minutes, an aliquot of the test solution was removed and neutralized with culture broth. The neutralized solution containing yeast was then plated on solid agar medium and allowed to incubate at 36±1° C. for 48 hours to identify viable colonies. Table 10 summarizes the results of duplicate replicates including the log-fold reduction in yeast for the two replicates combined for each solution. All example formulations containing the anionic surfactant (Examples 8, 9, and 10) provided dramatic reductions in yeast counts with no surviving yeast detected after treatment with the solutions. The solution from Example 2 (no anionic surfactant) was included to demonstrate the importance of adding the anionic surfactant for achieving improved antimicrobial properties, as the solution in Example 2 provided only a minimal reduction of yeast counts.

TABLE 10

| ANTI-BROWNING/ ANTIBACTERIAL SOLUTION | ORGANISM | REPLICATE | EXPOSURE TIME (MIN) | INITIAL YEAST CONCNTRTN. (CFU/ML) | VIABLE COLONIES (CFU/ML) | AVERAGE LOG$_{10}$ REDUCTION IN BACTERIA |
|---|---|---|---|---|---|---|
| Example 2 | *Candida albicans* | 1 | 15 | 7.34 × 10$^6$ | 4.30 × 10$^6$ | 0.35 |
|  | *albicans* | 2 |  |  | 2.30 × 10$^6$ |  |
| Example 8 | *Candida* | 1 | 15 | 7.34 × 10$^6$ | No growth | >6.17 |
|  | *albicans* | 2 |  |  | No growth |  |
| Example 9 | *Candida* | 1 | 15 | 7.34 × 10$^6$ | No growth | >6.17 |
|  | *albicans* | 2 |  |  | No growth |  |
| Example 10 | *Candida* | 1 | 15 | 7.34 × 10$^6$ | No growth | >6.17 |
|  | *albicans* | 2 |  |  | No growth |  |

*Caption: Antimicrobial efficacy of example antibrowning/antimicrobial solutions*

While the invention has been described in connection with several presently preferred embodiments thereof, those skilled in the art will appreciate that many modifications and changes may be made without departing from the true spirit and scope of the invention which accordingly is intended to be defined solely by the appended claims.

The invention claimed is:

1. A method of preserving minimally processed fruits and vegetables and extending their useful shelf-life comprising:
   a. providing an aqueous preservative solution comprising (i) at least 0.008 wt percent catechins and (ii) an organic acid or salt thereof selected from any one or any combination of ascorbic acid, erythorbic acid, and salts thereof; wherein the weight ratio of catechins to organic acid or salt thereof is from 1:10 to 1:300; and
   b. applying the preservative solution to a minimally processed fruit or vegetable.

2. The method of claim 1 wherein the catechins in the preservative solution are provided by a green tea extract added to the preservative solution.

3. The method of claim 2 wherein the green tea extract content in the preservative solution is from about 0.01 to 10% by weight.

4. The method of claim 3 wherein the green tea extract comprises at least 20 wt % epigallocatechin-3-gallate.

5. The method of claim 4 wherein the green tea extract comprises less than 10% caffeine.

6. The method of claim 1, further comprising packaging the minimally processed fruit or vegetable after applying the preservative solution.

7. The method of claim 6, further comprising storing the packaged minimally processed fruit or vegetable at from about −6° C. to about 20° C. under normal atmosphere and pressure.

8. The method of claim 6 wherein the fruit or vegetable is stored at from about 0° C. to about 6° C. under normal atmosphere and pressure.

9. The method of claim 1 wherein the catechins comprise at least 25 wt % epigallocatechin-3-gallate.

10. The method of claim 1 wherein the preservative solution further comprises a basic neutralizer approved for food use selected from the group consisting of: sodium hydroxide, potassium hydroxide, sodium carbonate, sodium bicarbonate, potassium carbonate, potassium bicarbonate, and calcium carbonate.

11. The method of claim 1 wherein the preservative solution comprises ascorbic acid or erythorbic acid, and a salt of ascorbic acid or of erythorbic acid.

12. The method of claim 1 wherein the organic acid or salt thereof is present in the preservative solution at from 0.2 wt % to 20 wt %.

13. The method of claim 1 wherein the organic acid or salt thereof is present in the preservative solution at from 0.5 wt % to 10 wt %.

14. The method of claim 1 wherein the organic acid or salt thereof is present in the preservative solution at from 1 wt % to 7 wt %.

15. The method of claim 1 wherein the organic acid or salt thereof is present in the preservative solution at from 2 wt % to 5 wt %.

16. The method of claim 1 wherein the preservative solution contains 0.008 wt % to 10 wt % catechins.

17. The method of claim 1 wherein the preservative solution contains 0.02 wt % to 1 wt % catechins.

18. The method of claim 1 wherein the preservative solution contains 0.05 wt % to 0.5 wt % catechins and the organic acid or salt thereof is present in the preservative solution at from 2 wt % to 5 wt %.

19. The method of claim 1 wherein the organic acid or salt thereof is ascorbic acid or salt thereof.

20. The method of claim 1 wherein the preservative solution further comprises a food safe anionic surfactant present at 0.001 wt % to 0.5 wt % to impart antimicrobial properties.

21. The method of claim 20 wherein the anionic surfactant is sodium lauryl sulfate.

22. An aqueous solution for preserving minimally processed fruits and vegetables and extending their useful shelf-life consisting essentially of (i) water; (ii) green tea extract; (iii) an organic acid or salt thereof selected from any one or any combination of ascorbic acid, erythorbic acid, and salts thereof; optionally (iv) a basic neutralizer approved for food use selected from the group consisting of: sodium hydroxide, potassium hydroxide, sodium carbonate, sodium bicarbonate, potassium carbonate, potassium bicarbonate, and calcium carbonate; and, optionally (v) a food-safe anionic surfactant; wherein the green tea extract comprises catechins, the catechins are present at a concentration of at least 0.008 wt % of the solution, and the weight ratio of catechins to organic acid or salt thereof in the solution is from 1:10 to 1:300.

\* \* \* \* \*